United States Patent [19]
Iverson et al.

[11] Patent Number: 5,920,659
[45] Date of Patent: Jul. 6, 1999

[54] METHOD AND APPARATUS FOR SCALING IMAGE DATA HAVING ASSOCIATED TRANSPARENCY DATA

[75] Inventors: Vaughn Iverson, Beaverton; Thomas Walsh, Portland, both of Oreg.

[73] Assignee: Intel Corporation, Santa Clara, Calif.

[21] Appl. No.: 08/669,079

[22] Filed: Jun. 24, 1996

[51] Int. Cl.[6] .................................................. G06K 9/32
[52] U.S. Cl. ...................... 382/298; 382/283; 382/299; 345/119; 345/154; 345/199; 348/587; 348/590; 395/114; 395/131; 395/502
[58] Field of Search ................................. 345/199, 154, 345/119; 395/502, 131, 114; 348/587, 590; 382/298, 299, 283

[56] References Cited

U.S. PATENT DOCUMENTS

| | | | |
|---|---|---|---|
| 5,384,582 | 1/1995 | Keith et al. ............................ | 345/199 |
| 5,398,075 | 3/1995 | Freytag et al. ......................... | 348/590 |
| 5,400,081 | 3/1995 | Chaplin ................................... | 348/587 |
| 5,408,542 | 4/1995 | Callahan ................................. | 382/56 |
| 5,461,679 | 10/1995 | Normile et al. ....................... | 382/304 |
| 5,469,536 | 11/1995 | Blank ..................................... | 395/131 |
| 5,471,563 | 11/1995 | Dennis et al. ......................... | 395/114 |
| 5,546,103 | 8/1996 | Rhodes et al. ......................... | 345/119 |
| 5,577,191 | 11/1996 | Bonomi .................................. | 395/502 |
| 5,604,514 | 2/1997 | Hancock ................................. | 345/154 |
| 5,640,543 | 6/1997 | Farrell et al. .......................... | 395/502 |

OTHER PUBLICATIONS

John C. Russ. (The image processing handbool), 1995, p. 155–165.

*Primary Examiner*—Leo H. Boudreau
*Assistant Examiner*—Kanji Patel
*Attorney, Agent, or Firm*—William H. Murray

[57] ABSTRACT

The resolution of one or more components of image data is changed to generate scaled image data and transparency processing is applied to the scaled image data, wherein the transparency processing is taken into account during the changing of the resolution of the image data. In a preferred embodiment in which a video codec applies transparency processing during the compression of subsampled video data, the capture processor applies the same transparency mask during data subsampling to decrease color-bleeding effects that may otherwise appear in the decoded video stream.

13 Claims, 4 Drawing Sheets

FIG. 1. ENCODING SYSTEM

FIG. 2. DECODING SYSTEM

METHOD AND APPARATUS FOR SCALING IMAGE DATA HAVING ASSOCIATED TRANSPARENCY DATA

BACKGROUND OF THE INVENTION

1. Field of the Invention

The present invention relates to image processing, and, in particular, to the compression of video images subject to transparency processing.

2. Description of the Related Art

Conventional video cameras generate video images in the form of three-component (e.g., red (R), green (G), and blue (B)) analog signals. Conventional personal computer (PC)-based video compression systems process these video signals for transmission and/or storage for subsequent playback by (1) digitizing the analog RGB signals into digital RGB data; (2) converting the RGB data to a color format that provides better compression (e.g., YUV); (3) subsampling the chroma components (e.g., U and V) to generate subsampled data (e.g., YUV9 format); and (4) applying a compression algorithm to the subsampled data to generate an encoded video bitstream.

In YUV9 format, for every (4×4) block of 8-bit Y (luma) components there is one 8-bit U (chroma) component and one 8-bit V (chroma) component. The color format is called YUV9 because there is an average of 9 bits per pixel in the subsampled image data. To generate YUV9 data under some conventional subsampling schemes, some form of averaging is applied to each (4×4) block of U components of the original unsampled data to generate each U component of the subsampled YUV9 data, and similarly for the V components. In the simplest scheme, the 16 U components in each (4×4) block are summed and the total divided by 16 to generate the subsampled U component, and similarly for V. More sophisticated schemes may rely on some form of weighted averaging, where each of the 16 chroma components contributes differently to the result depending upon its location within the (4×4) block.

The resulting subsampled image data may then be subjected to further compression processing (either lossy or lossless) to generate an encoded bitstream. When this compression processing involves the application of chroma-key-based transparency masks, the images generated by decoding the encoded bitstream can exhibit a video artifact known as a "fringe," "halo," or "color bleeding" at the edges between transparent and opaque regions. This artifact tends to reduce the quality of the video playback.

It is accordingly an object of this invention to overcome the disadvantages and drawbacks of the known art and to provide a subsampling scheme that reduces the above-described artifact and thereby improves the quality of video playback when transparency masks are applied during video compression.

Further objects and advantages of this invention will become apparent from the detailed description of a preferred embodiment which follows.

SUMMARY OF THE INVENTION

The present invention is directed to the processing of digital image data having one or more components. According to a preferred embodiment, the resolution of at least one of the components of the image data is changed to generate scaled image data and transparency processing is applied to the scaled image data, wherein the transparency processing is taken into account during the changing of the resolution of the image data.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

In a preferred embodiment of the present invention, if transparency processing is to be applied to the subsampled video data, that transparency processing is taken into account when the image data is subsampled. By taking the transparency processing into account before or during image subsampling, the inventors have discovered that the color-bleeding effect, which occurs at the edges between transparent and opaque regions of a transparency mask, can be reduced.

In chroma-key-based transparency processing, transparent regions of the mask are defined by a particular color or range of colors. For example, in the classic "weatherman standing in front of the weather map" situation, there are two video streams: one of the weatherman standing in front of a monochromatic (e.g., blue) background and one of the weather map. A combined "chroma-keyed" video stream is generated by applying the following logic pixel by pixel. Select a pixel from the weatherman video stream, unless it is blue, in which case, the corresponding pixel from the weather map video stream is selected. The determination of which pixels of the weatherman video stream correspond to the chroma-key color defines the transparency mask, where chroma-key pixels are transparent and all other pixels are opaque.

If chroma-key transparency processing is applied in a digital video processing system only after the video data for the weatherman video stream has been subsampled, color bleeding can result when some of the pixels of a subsampled region (e.g., (4×4) block) correspond to the chroma-key color. By taking the transparency mask into account during image subsampling, as in the present invention, the effect of this color bleeding can be reduced by diminishing or even eliminating the contribution that chroma-key pixels have to the generation of subsampled pixels.

Effects similar to color bleeding can also occur when applying transparency processing other than that based on chroma keying. These effects are similarly reduced when the transparency masks are taken into account during subsampling, as in the present invention.

System Hardware Architectures

Figure 1:
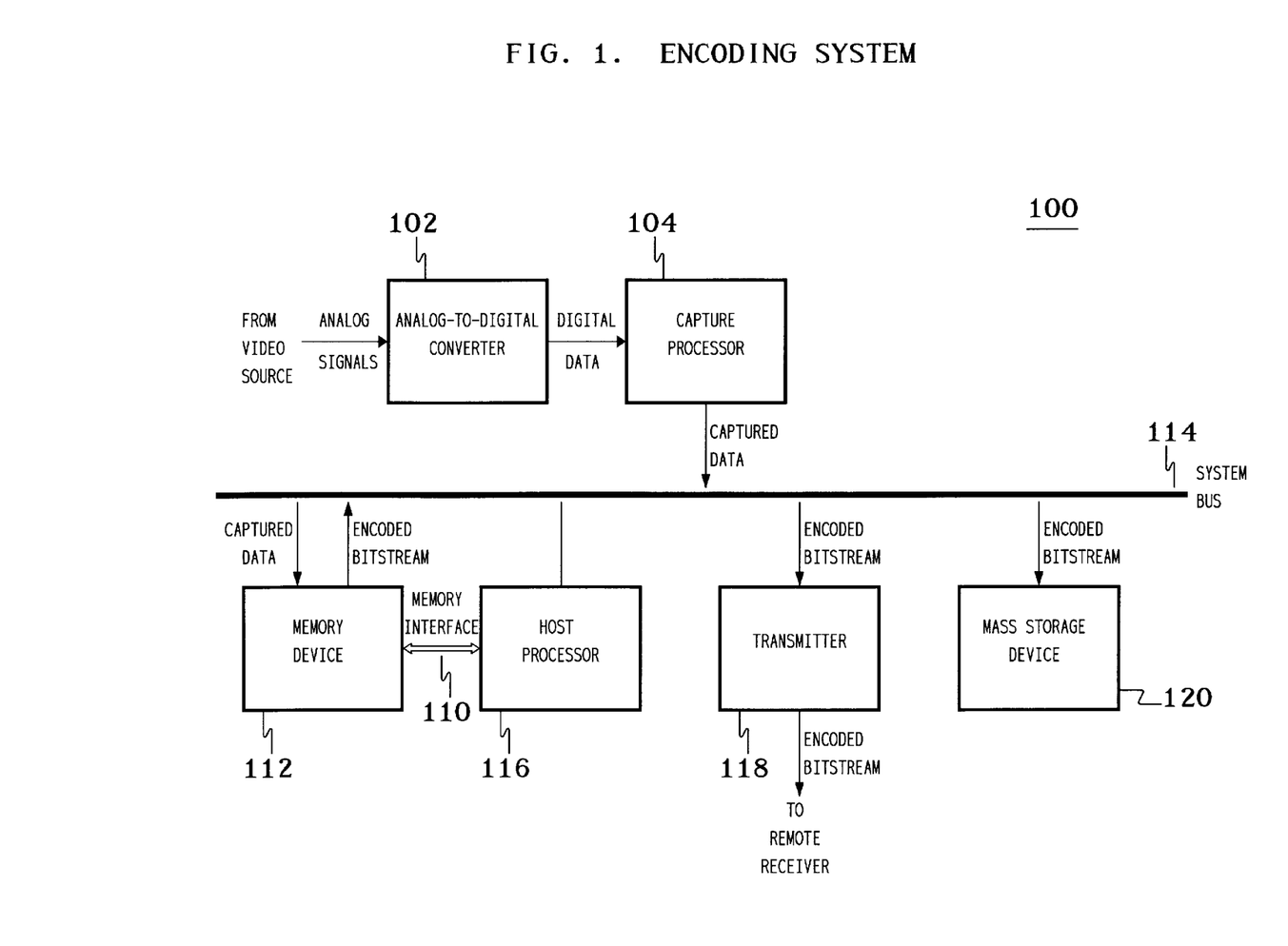
FIG. 1 is a block diagram of a video system for encoding video signals in a PC environment, according to a preferred embodiment of the present invention.

Referring now to FIG. 1, there is shown a computer system 100 for encoding video signals, according to a preferred embodiment of the present invention. Analog-todigital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 8-bit R, G, and B component data in RGB24 format).

Capture processor 104 captures the digital 3-component video data received from converter 102. In a preferred embodiment of the present invention, capture processor 104 selectively stores the captured data in full-resolution RGB24 format to memory device 112 and/or mass storage device 120 via system bus 114. Those skilled in the art will understand that, for real-time encoding, the captured data are preferably stored to memory device 112, while for non-real-time encoding, the captured data are preferably stored to mass storage device 120.

During real-time encoding, host processor 116 reads the captured bitmaps from memory device 112 via high-speed memory interface 110 and generates an encoded video bitstream that represents the captured video data. As described in the next section of this specification, host processor 116 converts the video data in RGB24 format to a YUV24 format, where each pixel is represented by 8-bit Y, U, and V components. Host processor 116 also performs chroma subsampling on the video data to generate video data in a subsampled format. In one embodiment, host processor 116 generates subsampled video data in a YUV9 (i.e., YUV 4:1:0) format, in which every (4×4) block of pixels of the Y-component plane corresponds to a single pixel in the U-component plane and a single pixel in the V-component plane. When performing chroma subsampling, host processor 116 takes into account transparency information in the form of a transparency mask. This transparency mask may be generated within host processor 116 or received by host processor 116 from an external source.

Depending upon the particular encoding scheme implemented, host processor 116 applies a sequence of compression steps to reduce the amount of data used to represent the information in the video images. In a preferred embodiment of the present invention, host processor 116 applies some form of transparency processing as part of its encoding scheme. The resulting encoded video bitstream is then stored to memory device 112 via memory interface 110. Host processor 116 may copy the encoded video bitstream to mass storage device 120 and/or transmit the encoded video bitstream to transmitter 118 for real-time transmission to a remote receiver (not shown in FIG. 1).

Figure 2:
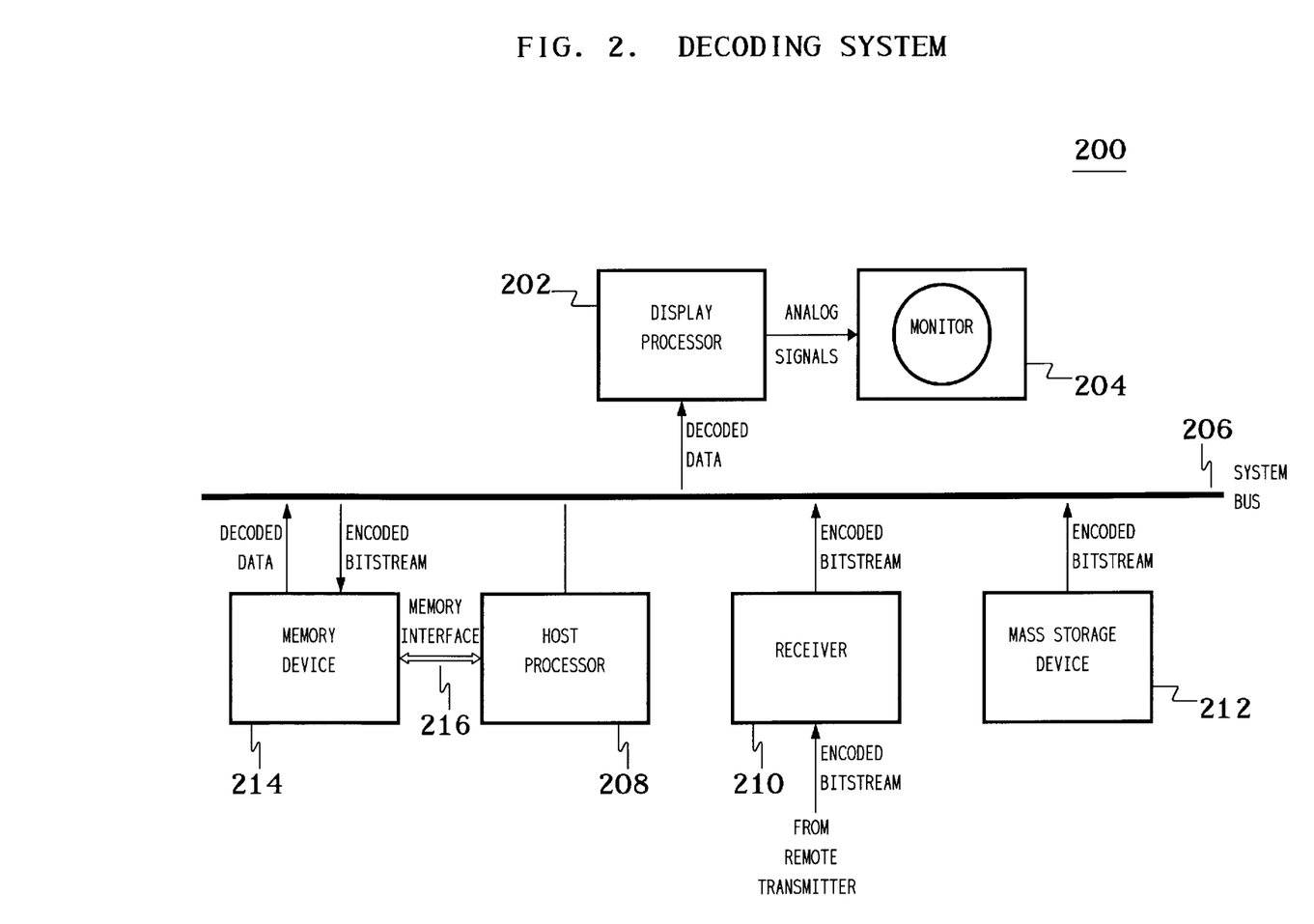
FIG. 2 is a computer system for decoding the video signals encoded by the computer system of FIG. 1, according to a preferred embodiment of the present invention.

Referring now to FIG. 2, there is shown a computer system 200 for decoding the encoded video bitstream encoded by encoding system 100 of FIG. 1, according to a preferred embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably a general-purpose microprocessor manufactured by Intel Corporation, such as an i486™ processor, Pentium® processor, or Pentium® Pro processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general-purpose microprocessor manufactured by Intel Corporation, such as an i486™ processor, Pentium® processor, or Pentium® Pro processor. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI 24-bit graphics board and an RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor, such as an Intel® i750® processor, or other suitable component(s) to off-load processing from the host processor by performing computationally intensive operations.

Subsampling with Transparency Processing

In conventional video encoding systems, transparency masks, such as those based on chroma keying, are applied only after the video data has been subsampled. For example, the capture processor of such a conventional system would capture the video data and store the captured data as subsampled bitmaps (i.e., component planes) to a memory device. If transparency processing was to be employed, the host processor would apply the transparency mask to the subsampled data during its subsequent video encoding processing of the subsampled data. Since, in these conventional systems, the capture processor is unaware of the downstream transparency processing, image subsampling takes all pixels into account - - - transparent and opaque alike. This can result in the deleterious color-bleeding effect described earlier.

According to a preferred embodiment of the present invention, however, capture processor 104 captures full-resolution RGB24 data and subsampling is performed by host processor 116 taking into account transparency information. That is, host processor 116 is aware of the transparency processing (e.g., has knowledge of the transparency mask) when it subsamples the video data.

Figure 3:
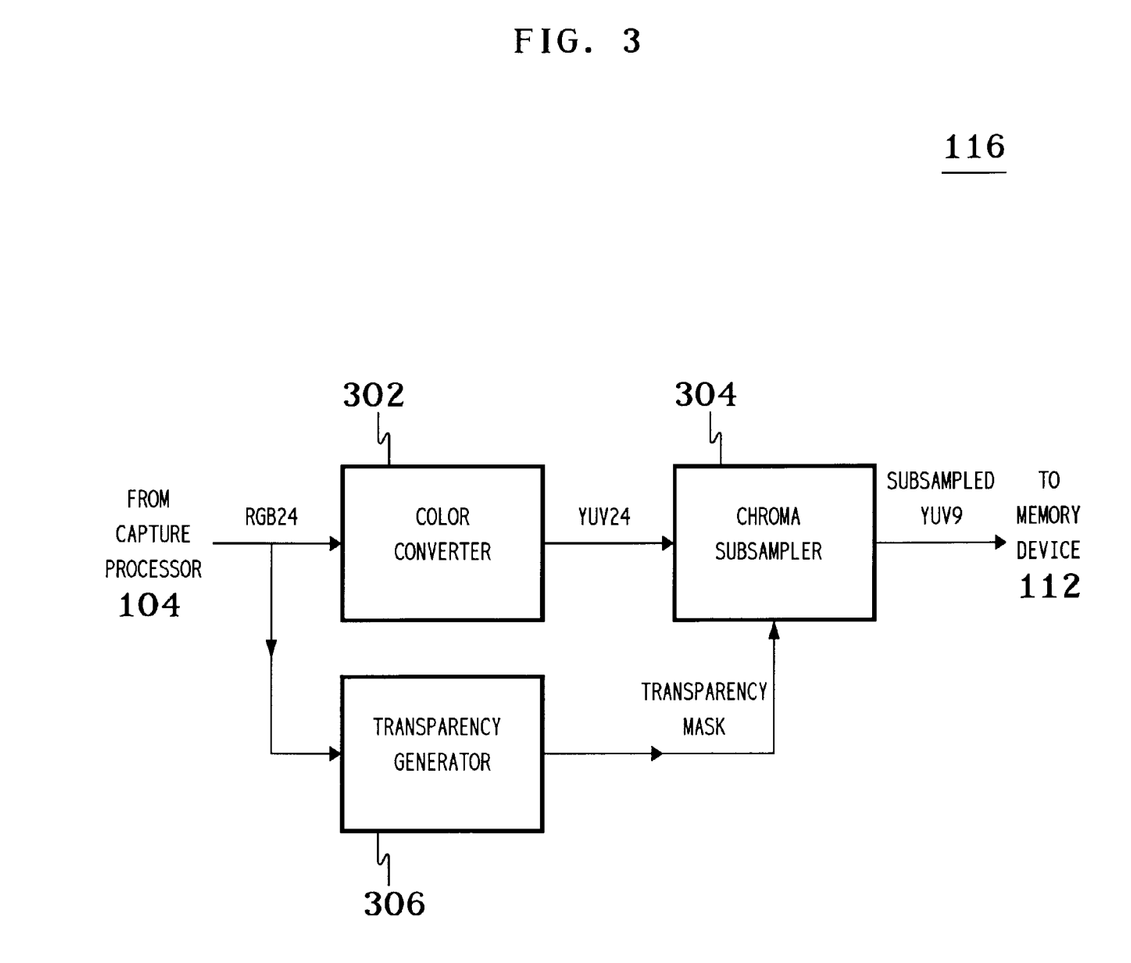
FIG. 3 is a block diagram of part of the host processor of FIG. 1.

Referring now to FIG. 3, there is shown a block diagram of the part of host processor 116 of FIG. 1 that performs color conversion and chroma subsampling, according to a preferred embodiment of the present invention. Color converter 302 receives the digitized RGB24 data that was captured by capture processor 104 of FIG. 1 and converts the RGB24 data into YUV24 data. Chroma subsampler 304 receives the YUV24 data from color converter 302 and generates subsampled YUV9 data by subsampling the U and V components taking into account a transparency mask. The transparency mask may be generated within host processor 116 (e.g., by transparency generator 306) or received from an external source (not shown). The transparency mask may be based on chroma-key processing or any other appropriate processing. Chroma subsampler 304 may also apply image scaling in which all of the component planes are resized in similar fashion. In that case, chroma subsampler 304 would operate as a more generic image scaler rather than exclusively as a subsampler of only chroma data.

In a preferred embodiment, there is a one-to-one correspondence between the pixels of the video data being subsampled by chroma subsampler 304 and the pixels of the transparency mask. The transparency mask may be either a binary mask or a multi-bit mask: With a binary mask, each mask pixel is either completely opaque (e.g., has value 1), in which case the original image pixel is retained, or completely transparent (e.g., has value 0), in which case the original image pixel is to be replaced with some other pixel (e.g., a specified value). With a multi-bit or alpha-channel mask, the contribution from each pixel is based on the relative magnitude of the corresponding mask pixel. A binary mask is really just a multi-bit mask having one-bit mask pixels.

Figure 4:
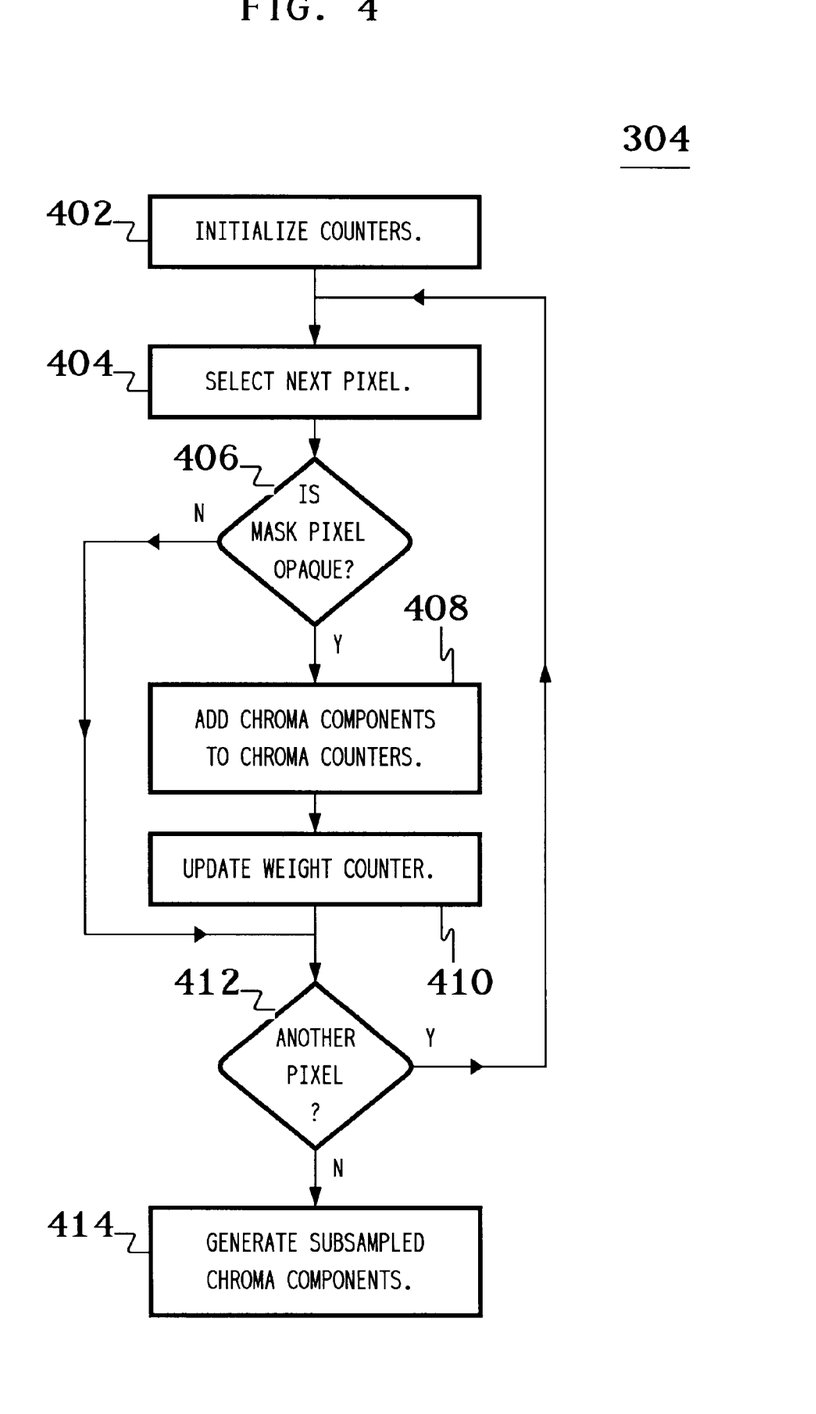
FIG. 4 is a flow diagram of the processing implemented by the chroma subsampler of FIG. 3 to subsample each block of chroma components when the transparency mask is a binary mask.

Referring now to FIG. 4, there is shown a flow diagram of the processing implemented by chroma subsampler 304 of FIG. 3 to subsample the U and V chroma components of each region (e.g., (4×4) block) of YUV24 image pixels when the transparency mask is a binary mask. If the mask pixel corresponding to the current image pixel is an opaque pixel (step 406 of FIG. 4), then the U component value for the current image pixel is added to a U component counter and the V component value for the current image pixel is added to a V component counter (step 408) and a weight counter is incremented (step 410). If, on the other hand, the mask pixel is not opaque (step 406), then it is transparent, in which case, the corresponding current image pixel is ignored (i.e., its U and V components are not added into the component counters and the weight counter is not incremented). After all of the pixels of the current block have been processed, the subsampled U and V components are generated (step 414). The subsampled U and V components may be generated by dividing the final U and V counter values by the final weight counter value (after testing to make sure that the final weight counter value is not zero as it will be if the entire block is transparent). Step 402 initializes the counters at the start of processing for the current block and steps 404 and 412 control the selection of image pixels of the current block.

The processing of FIG. 4 is an example of chroma subsampling based on straightforward averaging. Those skilled in the art will understand that alternative subsampling schemes are within the scope of the present invention, including weighted averaging schemes which apply different weight factors to the chroma components depending upon their positions within the block. It will also be understood that chroma subsampling of the present invention may be implemented when the transparency mask is a multi-bit or alpha-channel mask in which the mask pixel values effectively operate as additional weight factors to be taken into account during subsampling.

In general, the subsampling scheme of the present invention may be represented by Equation (1) as follows:

$$S = \frac{\sum PMW}{\sum MW} \quad (1)$$

where S is the subsampled component for a block, P is the component value, M is the transparency mask pixel value, and W is the pixel weight value. Completely transparent mask pixels have a value M of 0, while completely opaque mask pixels would a value M of $2^n-1$, where n is the number of bits per mask pixel. In the case of a binary mask, where n is 1, M is either 0 or 1.

In the subsampling of FIGS. 3 and 4, the resolution of the U and V chroma components is changed, while the resolution of the Y luma components stays the same. The present invention also applies to situations in which the resolutions of all three components change, for example, when the image data are all scaled up or down. Depending upon the particular scaling algorithm to be applied, according to the present invention, that scaling algorithm is adjusted when a transparency mask is to be applied to take the transparency mask into account during the scaling operation.

In general, taking the downstream transparency processing into account during image scaling means assigning the relative contribution that a given original image component has to the corresponding resulting scaled component, based on the magnitude of the corresponding pixel of the transparency mask. If the binary mask pixel has a magnitude of 0 (i.e., a transparent pixel), then the original image component preferably does not contribute to the scaled component, but if the binary mask pixel has a magnitude of 1 (i.e., an opaque pixel), then the original image component preferably does contribute to the scaled component.

For example, when scaling down by a fixed integer ratio using either straightforward or weighted averaging, the scaling operation for each component can be expressed as in Equation (1) above. For more complicated scaling algorithms (for example, fractional scaling using interpolation), the scaling operation would be adjusted accordingly to take the transparency mask into account during the interpolation process.

Similarly, under the present invention, a transparency mask is taken into account when scaling image data up. Take, for example, a situation in which image data is to be scaled up by a factor of three in the X direction (i.e., along image rows) using linear interpolation. In that case, the C0 and C1 components of the component sequence {C0, C1, C2} are normally to be replaced by the scaled component sequence {S0, S1, S2, S3, S4, S5} represented as follows:

$$\left\{ C0, \frac{2C0+C1}{3}, \frac{C0+2C1}{3}, C1, \frac{2C1+C2}{3}, \frac{C1+2C2}{3} \right\}$$

Assume further that the C0 and C1 components correspond to pixels of the weatherman, while component C2 corresponds to a pixel of the background chromakey color. In that case, the interpolation scheme above would result in bleeding of the chromakey color into pixels at the edge of the weatherman, and vice versa.

To avoid this result, under the present invention, a transparency mask can be applied during the scaling operation. For example, assume the binary transparency mask pixels corresponding to the scaled component sequence {S0, S1, S2, S3, S4, S5} are {1, 1, 1, 1, 1, 0} - - - that is, five opaque mask pixels followed by one transparent mask pixel. In that case, the transparency mask is preferably taken into account during the scaling operation and the resulting scaled component sequence {S0, S1, S2, S3, S4, S5} may, for example, be represented as follows:

$$\left\{ C0, \frac{2C0+C1}{3}, \frac{C0+2C1}{3}, C1, C1, C2 \right\}$$

In this example, the mask pixels are taken into account in generating the values of the upscaled components. As a result, the color bleeding effect can be inhibited and the sharp edge between the weatherman and the background can be maintained in the upscaled image. It will be understood that this example demonstrates a particular way in which the mask pixels are taken into account during upscaling. Other ways are also possible.

It will be understood that, for purposes of the present invention, scaling includes non-linear scaling (e.g., quadratic or spline-based scaling) and non-uniform scaling (e.g., stretching) as well as non-linear scaling (e.g., warping). In general, the present invention can be applied to any situation in which the resolution of image data (i.e., the number of pixels per unit area and/or the overall dimensions of the image) changes where transparency processing is taken into account during the resolution change. For purposes of this specification, subsampling may be considered to be a particular type of image scaling. Moreover, subsampling may be combined with other types of scaling. For example, host processor 116 of FIG. 1 may scale all of the component data (Y, U, and V) up or down in addition to subsampling the U and V components to generate subsampled YUV9 data.

In the preferred embodiment described above, transparency processing was described in terms of chroma-key-based processing in which two video streams are combined. Those skilled in the art will understand that the present invention covers other types of transparency processing, such as clipping. The present invention also covers processing such as image segmentation where portions of two or more images may be combined to form the images of a single video stream.

The present invention also covers still image processing in addition to video processing. Moreover, the image data need not be generated by a video camera. For example, the image data may be computer-generated animation or other video graphics data.

Although, in the examples presented above, the invention was described in terms of image data in YUV color format, it will be understood that the present invention applies to resolution changes in image data in any acceptable color format (e.g., monochromatic (gray-scale), RGB, YIQ). In addition, the present invention is not limited to the YUV9 subsampling scheme, but covers any subsampling scheme as well as scaling in general.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing digital image data having one or more components and associated transparency data comprising changing resolution of at least one of the components of the image data to generate scaled image data using transparency data to reduce interference between a desired portion of input pixels and an undesired portion of the input pixels, wherein the resolution of at least one of the components is changed by applying the equation $$S = \frac{\sum_i P_i M_i W_i}{\sum_i M_i W_i}$$

wherein S is a scaled component for a block of image data, $P_i$ is an unscaled component of the block at image location i, $M_i$ is a transparency mask pixel at image location i and $W_i$ is a pixel weight value for image location i.

2. The method of claim 1 wherein changing resolution of at least one of the components of the image data comprises subsampling a subset of the components of the image data.

3. The method of claim 1 wherein using the transparency data comprises applying a transparency mask to the scaled image data.

4. The method of claim 1 wherein using the transparency data is derived from chroma keying.

5. The method of claim 1 further comprising the step of compressing the resulting processed image data.

6. The method of claim 1 comprising changing the resolution of all of the components of the image data.

7. The method of claim 1 further comprising the step of applying lossy compression to the resulting processed image data wherein:

the digital image data comprises video data having Y, U and V components; and the resolution of at least one of the components is changed by applying the following equation:

$$S = \frac{\sum_i P_i M_i W_i}{\sum_i M_i W_i}$$

wherein S is a scaled component for a block of image data, $P_i$ is an unscaled component of the block at image location i, and $M_i$ is a transparency mask pixel at image location i and $W_i$ is a pixel weight value for image location i.

8. An apparatus for processing digital image data having one or more components and associated transparency data comprising means for changing resolution of at least one of the components of the image data to generate scaled image data using the transparency data to reduce interference between a desired portion of the input pixels and an undesired portion of the input pixels, wherein said means for changing resolution of at least one of the components of the image data comprises means for applying the equation $$S = \frac{\sum_i P_i M_i W_i}{\sum_i M_i W_i}$$

wherein S is a scaled component for a block of image data, $P_i$ is an unscaled component of the block at image location i, $M_i$ is a transparency mask pixel at image location i, and $W_i$ is a pixel weight value for image location i.

9. The apparatus in accordance with claim 8 further comprising means for applying lossy compression to the resulting processed image data wherein:

the digital image data comprises video having Y, U and V components; and the resolution of at least one of the components is changed by applying the following equation:

$$S = \frac{\sum_i P_i M_i W_i}{\sum_i M_i W_i}$$

wherein S is a scaled component for a block of image data, $P_i$ is an unscaled component of the block of image data at location i, $M_i$ is a transparency mask pixel at image location i, and $W_i$ is a pixel weight value for image location i.

10. A storage medium encoded with machine-readable computer program code for processing digital image data having one or more components and associated transparency data including means for changing resolution of at least one of the components of the image data to generate scaled image data using the transparency data to reduce interference between a desired portion of input pixels and an undesired portion of the input pixels, wherein said means for changing resolution of at least one of the components of the image data comprises means for applying the equation $$S = \frac{\sum_i P_i M_i W_i}{\sum_i M_i W_i}$$

wherein S is a scaled component for a block of image data, $P_i$ is an unscaled component of the block at image location i, $M_i$ is a transparency mask pixel at image location i and $W_i$ is a pixel weight value for image location i.

11. The storage medium of claim 10 further comprising means for applying lossy compression to the resulting processed image data wherein:

the digital image data comprises video data having Y, U and V components; and the resolution of at least one of the components is changed by applying the following equation:

$$S = \frac{\sum_i P_i M_i W_i}{\sum_i M_i W_i}$$

wherein S is a scaled component for a block of image data, $P_i$ is an unscaled component of the block at image location i, and $M_i$ is a transparency mask pixel at image location i and $W_i$ is a pixel weight value for image location i.

12. An apparatus for processing digital image data having one or more components and associated transparency data comprising an image scaler for changing resolution of at least one of the components of the image data to generate scaled image data using the transparency data to reduce interference between a desired portion of input pixels and an undesired portion of the input pixels, wherein the resolution of at least one of the components is changed by applying the equation $$S = \frac{\sum_i P_i M_i W_i}{\sum_i M_i W_i}$$

wherein S is a scaled component for a block of image data, $P_i$ is an unscaled component of the block at image location i, $M_i$ is a transparency mask pixel at image location i and $W_i$ is a pixel weight value for image location i.

13. The apparatus in accordance with claim 12 further comprising means for applying lossy compression to the resulting processed image data wherein:

the digital image data comprises video data having Y, U and V components; and the resolution of at least one of the components is changed by applying the following equation:

$$S = \frac{\sum_i P_i M_i W_i}{\sum_i M_i W_i}$$

wherein S is a scaled component for a block of image data, $P_i$ is an unscaled component of the block at image location i, and $M_i$ is a transparency mask pixel at image location i and $W_i$ is a pixel weight value for image location i.

* * * * *